(12) United States Patent
Erickson et al.

(10) Patent No.: US 6,386,407 B1
(45) Date of Patent: May 14, 2002

(54) BICYCLE CARRIER WITH SELECTIVELY POSITIONABLE ANTI-SWAY CRADLES

(75) Inventors: Donald J. Erickson, Saratoga, CA (US); Jay L. Walker, Champaign, IL (US)

(73) Assignee: Yakima Products, Inc., Arcata, CA (US)

(*) Notice: Subject to any disclaimer, the term of this patent is extended or adjusted under 35 U.S.C. 154(b) by 0 days.

(21) Appl. No.: 09/584,312

(22) Filed: May 31, 2000

(51) Int. Cl.[7] .................................................. B60R 7/00
(52) U.S. Cl. ...................... 224/282; 224/497; 224/500; 224/501; 224/505; 224/532; 224/537; 224/314; 224/324; 224/924
(58) Field of Search ................................ 224/282, 492, 224/493, 497, 500, 501, 502, 503, 504, 505, 508, 522, 531, 532, 537, 314, 324, 329, 42.11, 548, 549, 550, 551, 552, 553, 924

(56) References Cited

U.S. PATENT DOCUMENTS

| 4,452,385 | A | | 6/1984 | Prosen ........................ 224/321 |
| 5,056,700 | A | | 10/1991 | Blackburn et al. ........... 224/324 |
| D329,035 | S | * | 9/1992 | Blackburn et al. ......... D12/158 |
| 5,259,542 | A | * | 11/1993 | Newbold et al. ............ 224/324 |
| 5,363,996 | A | * | 11/1994 | Raaber et al. ............... 224/314 |
| 5,573,165 | A | * | 11/1996 | Bloemer et al. ............. 224/523 |
| 5,938,093 | A | * | 8/1999 | Bloemer et al. ............. 224/553 |

* cited by examiner

Primary Examiner—Stephen K. Cronin
(74) Attorney, Agent, or Firm—Kolisch Hartwell Dickinson McCormack & Heuser

(57) ABSTRACT

A bicycle carrier has a frame mountable to a vehicle and defining a pair of spaced apart support arms for supporting one or more bicycles. The support arms are provided with positioning guides, which may take the form of spaced circumferential ridges and troughs extending along the support arms. The ridges and troughs may be formed by a ribbed sleeve mounted on the support arms. At least one cradle is mounted on each support arm for receiving and releasable holding a selected tube or tubes of a bicycle frame. Each cradle has an opening through which the support arm extends and a tab projects partially into the opening. The tabs are configured to be received and to ride within selected ones of the troughs of the support arms for rotatably positioning the cradles at desired positions along their support arms. A channel extends along the support arms interrupting the ridges. The cradles may be moved easily to a new location along their support arms by rotating them to align their tabs with the channel and sliding the cradles to the new location. At the new location, the cradles are rotated back to engage their tabs with the trough at the new location.

26 Claims, 4 Drawing Sheets

BICYCLE CARRIER WITH SELECTIVELY POSITIONABLE ANTI-SWAY CRADLES

TECHNICAL FIELD

This invention relates generally to bicycle accessories and more specifically to bicycle carriers mountable to the rear of a vehicle for receiving and carrying one or more bicycles.

BACKGROUND

Bicycling has become a popular sport in recent years and the number of cyclists engaged in casual, sports, and extreme bicycling have increased dramatically. Many popular bicycling activities, such as mountain biking for example, generally are enjoyed at remote locations distant from a cyclist's home. As a result, there has arisen a need with the increasing popularity of bicycling for convenient and reliable methods of transporting bicycles to and from bicycling locations. To fill this need, a variety of automotive bicycle carriers have been developed. Some of these carriers, referred to as roof-mount carriers, are mounted to the roof of an automobile for securing one or more bicycles to the roof for transport. Others, known as trunk, rear, or hitch mount carriers, are designed to be mounted to the rear end or trunk portion of an automobile for carrying one or more bicycles immediately behind the automobile. In general, trunk mount carriers include tubular frames that are strapped to the rear end portion of an automobile or fixed in a trailer hitch adapter and that are formed with a pair of rearwardly projecting support arms upon which one or more bicycles are suspended and secured for transport.

Rear mount bicycle carriers are available in a number of configurations. U. S. Pat. No. 5,056,700, for example, discloses an automobile mountable bicycle carrier having a frame that is mounted to the trunk portion of an automobile. The carrier is mounted to an automobile by lashing it with straps to the rear end portion of the automobile with trunk and bumper engaging bars resting on top of the trunk and bumper respectively. A U-shaped support member defining a pair of spaced support arms extends rearwardly (with respect to the automobile) from the frame. A pair of mounting brackets or control blocks are attached to each of the spaced support arms for receiving bicycle frames to suspend the frames from the support arms for transport. U.S. Pat. No. 4,452,385 discloses a similar carrier with spaced rearwardly extending bicycle support arms as does U. S. Pat. No. 5,826,767. Rear mount bicycle carriers that are releasably secured within the hitch adapter of an automobile or truck also are available and, like other carriers, may have a pair of rearwardly projecting support arms and cradles from which one or more bicycles are suspended during transport.

Most bicycle carriers with spaced support arms are provided with pairs of cradles that are mounted to the support arms. In most cases, two or more pairs of cradles can be mounted to the support arms of the carrier to accommodate the transport of two or more bicycles on the same carrier. The cradles usually are configured with V or U shaped saddles shaped to receive and hold the top tube of a bicycle frame. Elastic straps may be are provided for strapping the bicycle frame to the cradles so that the bicycle is securely but releasably attached to the carrier during transport. Many carriers also include anti-sway devices, which may or may not be incorporated into the cradles themselves. Generally, these anti-sway devices are configured to receive and hold one of the vertically extending tubes of the bicycle frame, usually the down tube, to inhibit and prevent to-and-fro swaying motion of the bicycle as it is transported.

It is desirable in many cases that the cradles and anti-sway devices of a bicycle carrier be adjustable along the length of their support arms to accommodate various bicycle sizes and carrying configurations. However, in the past some bicycle carriers have been provided with cradles that either are not adjustable at all, are adjustable to only limited positions, or that require tools and inordinate time and effort to effect a position adjustment. As a result, cyclists have been relegated simply to making do or improvising when a pair of cradles on their bicycle carrier are not mounted in the most desirable positions along the support arms. In any event, the need for convenient user adjustment of the positions of the cradles and anti-sway devices has not been addressed successfully by bicycle carrier manufacturers.

Thus, a need exists for a bicycle carrier having spaced support arms carrying pairs of cradles that can be easily, quickly, accurately, and reliably be adjusted by a cyclist to virtually any desired position along their support arms. A further need exists for the cradles of such a carrier to be simple, interchangeable, and reversible if needed with each cradle being capable of serving an anti-sway function if required as well as a bicycle frame holding function. It is to the provision of such a bicycle carrier that the present invention is primarily directed.

SUMMARY OF THE INVENTION

Briefly described, the present invention, in a preferred embodiment thereof, comprises a bicycle carrier for supporting one or more bicycles on a vehicle for transport. In the preferred embodiment discussed herein, the bicycle carrier is a trunk mount carrier. However, the invention is also applicable to carriers other than trunk mount carriers such as, for example, hitch mount carriers, and should not be considered to be limited only to trunk mount carriers of the preferred embodiment.

The bicycle carrier of this invention comprise a frame mountable to the rear of a vehicle such as an automobile. Conventionally, the frame defines a pair of spaced apart rearwardly extending support arms for receiving and supporting one or more bicycle frames for transport. Each support arm is provided with a plurality of spaced apart positioning guides extending along the length of the support arm. In the preferred embodiment, the positioning guides take the form of an array of spaced annular troughs extending along the support arm. In the preferred embodiment, the troughs are defined by a ribbed tubular sleeve mounted over and covering the support arm, the sleeve preferably being made of plastic and having a corrugated outer surface defining annular ridges and troughs extending along the sleeve.

At least one cradle is mounted on each of the support arms and the cradles have openings through which the support arms and ribbed sleeve extend. Each of the cradles preferably, but not necessarily, is an anti-sway cradle. That is, each cradle is formed with a first saddle that can be positioned to receive and hold a top tube of a bicycle frame mounted on the carrier and a second saddle that can be positioned, if needed, to receive and hold a down tube of the bicycle frame. In this way, undesirable-swaying motion of the bicycle during transport is inhibited.

Each of the cradles is formed with a positioning member in the form of a tab that extends partially into the opening of the cradle. The tab is sized and shaped to be received and to ride within any of the annular troughs defined by the ribbed sleeve on which the cradle is mounted. It will thus be seen that the particular trough in which the tab is located determines the position of the cradle along the length of its support arm. Further, since the tab of the cradle rides within its selected trough, the cradle is freely rotatable about its support arm to any desired orientation.

A channel is formed along the ribbed sleeve, preferably along the bottom of the support arm, and interrupts the annular ribs of the sleeve. The channel is sized such that when the tab of a cradle mounted on the support arm is rotated to align its tab with the channel, the cradle may be slid along the support arm with its tab moving along the channel. In this way, cradles may be slid easily to any desired location along their support arms. Once a cradle is slid to a desired location, it may simply be rotated back around to an operational orientation, whereupon its tab moves into a trough of the ribbed sleeve at the new location to fix the position of the cradle along its support arm. It will thus be seen that the cradles of the carrier are quickly and easily adjustable to any desired positions along their support arms to accommodate bicycles of different sizes and configurations.

Each of the cradles of the invention preferably is an anti-way cradle and, for this purpose, is formed with two saddles sized to receive and hold selected tubes of a bicycle frame. Each saddle is identical, and thus reversible and interchangeable as needed and each has two operational orientations. In one orientation, appropriate when the cradle is located adjacent the junction of the top tube and the down tube of a bicycle frame, the first saddle of the cradle receives and holds the top tube of the frame and the second saddle receives and holds the down tube of the frame. Elastic straps releasably secure the tubes of the bicycle frame to the cradle. Thus, the first saddle holds the top tube at a selected position along the support arm and the second saddle prevents the frame of the bicycle from swaying back and forth during transport.

In the second operational orientation of the cradle, appropriate when the cradle is to hold only the top tube of the bicycle frame, the cradle is rotated about its support arm to engage its second saddle with the top tube of the frame and an elastic strap secures the tube to the cradle. Generally, a bicycle frame is mounted on the carrier with the cradle on one support arm being oriented to hold the top and down tubes as described and with an opposed cradle on the other support arm being oriented to hold the top tube at a location spaced from the down tube. In this way, the bicycle frame is held securely on the carrier and is prevented from swaying during transport.

Thus, a bicycle carrier is now provided that includes cradles on its support arms that are selectively positionable at any desired position along the length of their respective support arms. Further, the adjustment is quickly and easily accomplished by a user without the need for any tools or special skills. Once a cradle is positioned, it is freely rotatable about the support arm to adapt the cradle for holding the top tube of a bicycle frame or for holding the top tube and providing the anti-sway function by holding the down tube simultaneously. These and other features, objects, and advantages of the bicycle carrier of this invention will become more apparent upon review of the detailed description set forth below when taken in conjunction with the accompanying drawing figures, which are briefly described as follows.

DETAILED DESCRIPTION OF THE PREFERRED EMBODIMENTS

Figure 1:
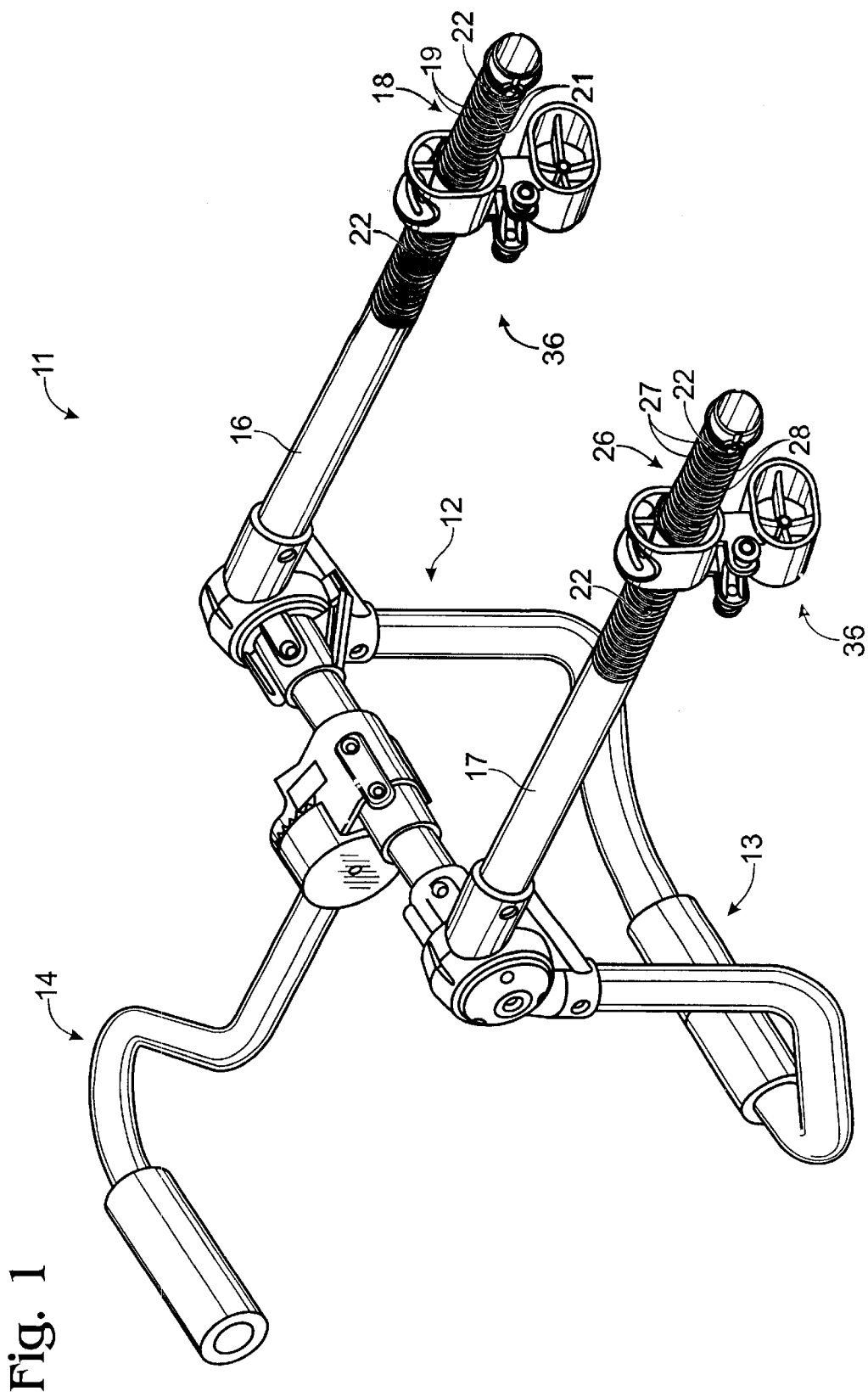
FIG. 1 is a perspective view of a bicycle carrier with selectively positionable anti-sway cradles that embodies principles of the present invention in a preferred form.

Referring now in more detail to the drawings, wherein like numerals refer to like parts throughout the several views, FIG. 1 illustrates a bicycle carrier that embodies principles of the invention in a preferred form. The carrier 11, which is a trunk mount carrier in the illustrated embodiment, has a frame 12, which preferably is formed of tubular steel or other appropriate material. The frame 12 is configured to define a bumper engaging bar 13, which is covered with a rubberized pad, and a trunk engaging bar 14, which also is covered with a rubberized pad. When lashed to the trunk portion of an automobile, the bumper engaging bar 13 rests on the rear bumper of the automobile where the bumper meets the rear panel and the trunk engaging bar rests atop the trunk. Conventionally, the carrier is securely lashed to the automobile with straps (not shown).

The frame 12 is further formed to define a first support arm 16 and a second support arm 17, which are spaced apart, parallel, and extend rearwardly with respect to the automobile when the carrier is lashed thereto. The support arms 16 and 17 are positioned and spaced to receive and support one or more bicycles suspended from the support arms with the top tubes of the bicycles generally extending across the tops of the support arms in the conventional way.

A ribbed sleeve 18 is mounted over and covers the support arm 16 and may be secured thereto by means of screws or other appropriate fasteners extending through screw holes 22 and into the support arm. The ribbed sleeve 18 is illustrated in FIG. 1 in a partially cut-away view revealing the front-end portion of the support arm 16 around which the sleeve is mounted. It will be understood, however, that, preferably, the ribbed sleeve covers substantially the entire length of the support arm, although this is not a requirement of the invention and the sleeve may, if desired, cover only a portion of the support arm. The ribbed sleeve 18 is formed with annular corrugations that define a plurality of ridges 19 and troughs 21 that extend along the length of the sleeve 18 and thus along the length of the support arm 16 covered by the sleeve.

A cradle 36 configured according to the invention is mounted on the support arm 16 with the ribbed sleeve extending through a tubular opening 42 (FIG. 4) formed in the cradle. The configuration and function of the cradle 36 is described in more detail below. In general, however, the cradle 36 is rotatable about the support arm 16 and is formed with saddles for receiving and releasably holding selected tubes of a bicycle frame to secure the bicycle to the carrier and to prevent the bicycle from swaying during transport. The cradle 36 is formed with a tab 43 (FIG. 4) that projects partially into the tubular opening of the cradle. The tab 43 is configured and positioned to be received in and to ride within a selected one of the troughs 21 formed by the ribbed sleeve 18. In this way, the cradle 36 is fixed at a position along the length of its support arm corresponding to the position of the trough in which its tab rides but nevertheless is free to rotate about the support arm with the tab around in the trough.

Similarly, a ribbed sleeve 26 is mounted over and covers the opposing support arm 17 and, although illustrated partially cut-away, preferably covers substantially the entire length of the support arm. Like the ribbed sleeve 18, the ribbed sleeve 26 has a circumferentially corrugated outer surface forming a plurality of spaced ridges 27 and troughs 28 that extend along the length of the sleeve. Screw holes 22 are provided for securing the ribbed sleeve 26 to the support arm 17 with screws or other appropriate fasteners.

A cradle 36 also is mounted to the support arm 17 and is identical to the cradle 36 mounted on the opposing support arm 17. The cradle 36 on support arm 17 is formed with a tubular opening 42 (FIG. 4) through which the ribbed sleeve 26 extends and includes a tab 43 (FIG. 4) that extends partially into the opening. The tab 43 resides and rides within a selected one of the troughs 28 of the ribbed sleeve 26 to fix the cradle at a desired position along the length of its support arm while allowing the cradle to be rotated about the support arm for purposes described in more detail below.

Figure 2:
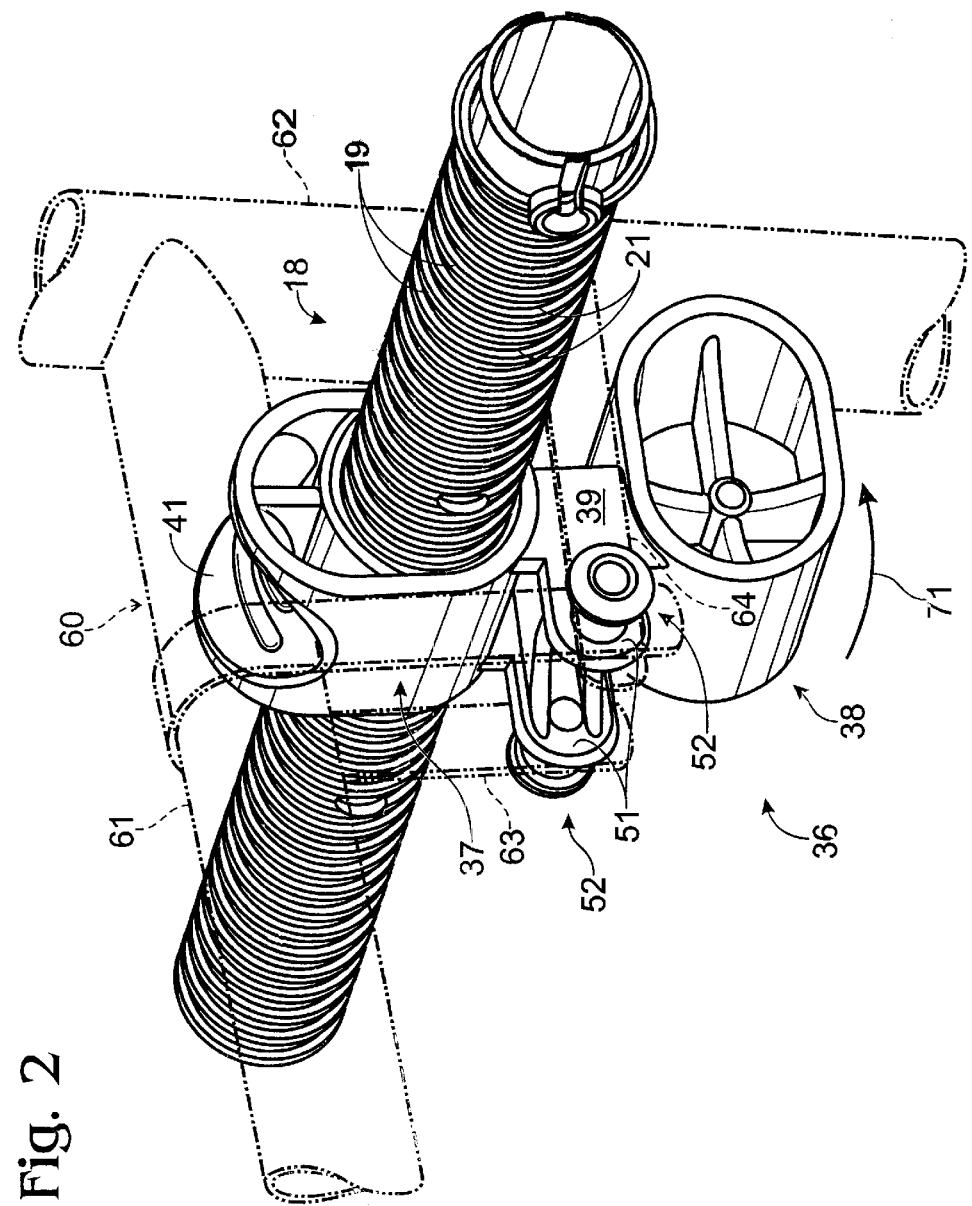
FIG. 2 is an enlarged perspective view of a portion of one of the support arms of the carrier of FIG. 1 showing a bicycle frame supported by a cradle mounted thereon.

FIG. 2 illustrates better the details of the cradle 36 as it appears in its bicycle support and anti-sway orientation. The cradle 36 is seen mounted on the cirmferentially ribbed sleeve 18 as described with the sleeve extending through the tubular opening 42 (FIG. 4) formed in the cradle. The ribbed sleeve 18 defines spaced ridges 19 and troughs 21 and the inwardly projecting tab 43 of the cradle rides in one of the troughs to position the cradle on the support arm while allowing its rotation as described. The cradle 36, which preferably is formed of injection molded plastic, has an upper (as seen in FIG. 2) portion 37 and a lower (as seen in FIG. 2) portion 38 connected together by a central spar member 39. The spar member 39 is formed with projecting lobes 51 that each carries a strap post 52 to which the ends of and elastic strap may be releasably attached.

The upper portion 37 of the cradle is formed with a depression or saddle 41, which preferably, but not necessarily, is over-molded or over-shot with a relatively softer rubberized surface material to create a frictional engagement with a bicycle frame tube nestled in the saddle. Similarly, the lower portion 38 of the cradle is formed with a saddle 46 (best seen in FIG. 3), which also is over-molded with a relatively softer rubberized surface. The saddles 41 and 46 preferably face in directions substantially ninety degrees apart, although other relative orientations of the saddles certainly are possible according to application specific requirements.

The cradle 36 in FIG. 2 is illustrated in one of its functional rotational orientations for holding a bicycle frame and simultaneously securing the bicycle against swaying motion during transport. More specifically, a portion of a bicycle frame 60 is shown (in phantom lines for clarity) as it appears when the bicycle is mounted to the carrier with the top tube 61 of the frame extending across the support arms of the carrier. The cradle 36 is shown positioned adjacent the intersection of the top tube 61 and the down tube 62 of the bicycle frame. The cradle 36 is oriented such that top tube 61 is positioned and nestled within the rubberized saddle 41 of the upper portion 37 of the cradle. Further, the cradle is rotated in the direction of the down tube 62 (as indicated by arrow 71) such that the down tube 62 is positioned and nestled within the rubberized saddle 46 of the cradle.

An elastic strap 63 (shown in phantom line) extends around the top tube 61 of the bicycle frame and the respective ends of the strap are releasably secured to the strap posts 52. Thus, the elastic strap 63 securely but releasably holds the top tube 61 of the bicycle frame within the rubberized saddle 41 of the cradle. Similarly, an elastic strap 64 extends around the down tube 62 of the frame and is releasably secured at is respective ends to the strap posts 52. The down tube is thus securely but releasably held within the rubberized saddle 46 of the cradle. It will be understood that the other end of the top tube 61 of the bicycle frame is supported in an opposing cradle on the other support arm, as described in more detail below.

It will be appreciated by those of skill in the art that, with the cradle 36 oriented and strapped to the bicycle frame as shown in FIG. 2, the cradle simultaneously holds the bicycle frame and prevents the bicycle from swaying during transport. More specifically, the rubberized saddle 47 holds the top tube of the frame and prevents it from moving in a direction along the support arm. At the same time, the rubberized saddle 46 holds the down tube of the frame securely and thus prevents the frame from swinging about its top tube, thereby preventing swaying motion of the bicycle during transport. When it is desired to remove the bicycle from the carrier, the elastic straps 63 and 64 are simply removed from around their respective tubes and the frame is free to be lifted off of the support arm.

Figure 3:
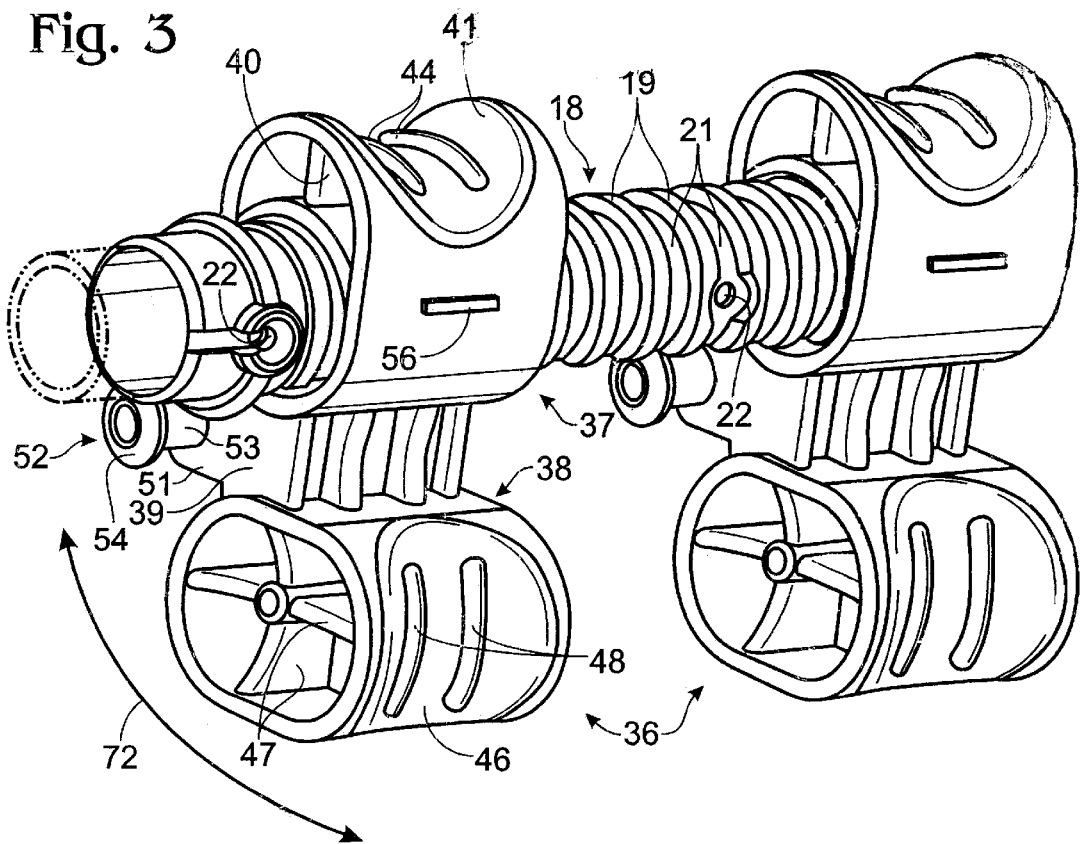
FIG. 3 is an enlarged perspective view of anti-sway cradles mounted on a support arm of a bicycle carrier according to the invention.

FIG. 3 illustrates a pair of cradles 36 mounted on the ribbed sleeve 18 covering a support arm of a bicycle carrier. In practice, two or more cradles usually are mounted on each support arm so that the carrier can be used to transport two or more bicycles. As discussed above, the ribbed sleeve 18 is formed to define an array of spaced ridges 19 and troughs 21 extending along the support arm. Each cradle 36 is mounted on the sleeve with the sleeve extending through the tubular opening 42 formed through the cradle. Further, the inwardly projecting tab 43 (FIG. 4) of each cradle is disposed and rides within a selected one of the troughs 21 to position the cradle at a selected location along its support arm while allowing the cradle to rotate about the support arm. Each cradle 36 has an upper portion 37 and a lower portion 38 connected together by a spar member 39. The spar member 39 has projecting lobes 51 that carry respective strap posts 52, each formed with a shaft 53 and a relatively larger head 54 for securing the ends of an elastic strap.

The upper portion 37 of the cradle is formed with a rubberized saddle 41, which preferably includes a set of ribs 44 to enhance the frictional engagement between the saddle and a tube of a bicycle frame nestled in the saddle. A rubberized pad 56 is also over-molded on the upper portion 37 to prevent the hard plastic of the cradle from rubbing against and scratching the finish on a bicycle frame secured in the cradle. The lower portion 38 of the cradle is formed with a rubberized saddle 46, which also preferably includes ribs 48 to enhance frictional engagement with a tube of a bicycle frame. Both the upper and lower portions of the cradle preferably are hollow to reduce the weight of the cradle. To provide strength, a structural rib 40 is molded into the upper portion of the cradle and structural ribs 47 are molded into the lower portion of the cradle. Of course, many other structural configurations are possible within the scope of the present invention. Each of the cradles 38 is free to be rotated about the support arm to any rotational orientation as indicated by arrow 72.

Figure 4:
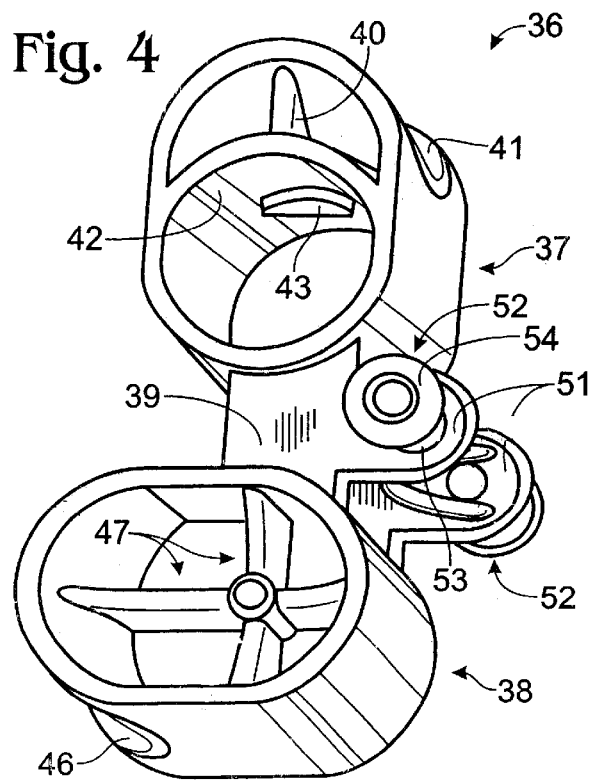
FIG. 4 is a perspective view of an anti-sway cradle that embodies principles of the invention in a preferred form.

FIG. 4 illustrates in detail the structure of a cradle configured according to the invention and shows the interior wall structure of the tubular opening 42. As previously discussed, the cradle 36 has an upper portion 37 and a lower portion 38 connected by a spar member 39. The spar member 39 is formed with lobes 51 that carry strap posts 52 formed with shanks 53 and heads 54. The upper portion 37 is formed with a rubberized saddle 41 and the lower portion 38 is formed with a saddle 46 that faces in a direction substantially normal to that of saddle 41. The upper portion 37 of the cradle is strengthened by a structural rib 40 and the lower portion 38 is strengthened by a set of structural ribs 47.

An arcuate tab 43 is formed in the wall of the tubular opening 42 and projects partially into the opening. The tab 43 is sized and configured to be received in and to ride within any one of the spaced troughs 21 formed by the ribbed sleeve 18 when the cradle is mounted over the sleeve. The troughs 21 of the sleeve thus function as positioning guides that extend along the length of the support arm and the inwardly projecting tab 43 functions as a positioning member that is matable with a selected one of the positioning guides to locate the cradle at a desired position along the length of its support arm.

Figure 5:
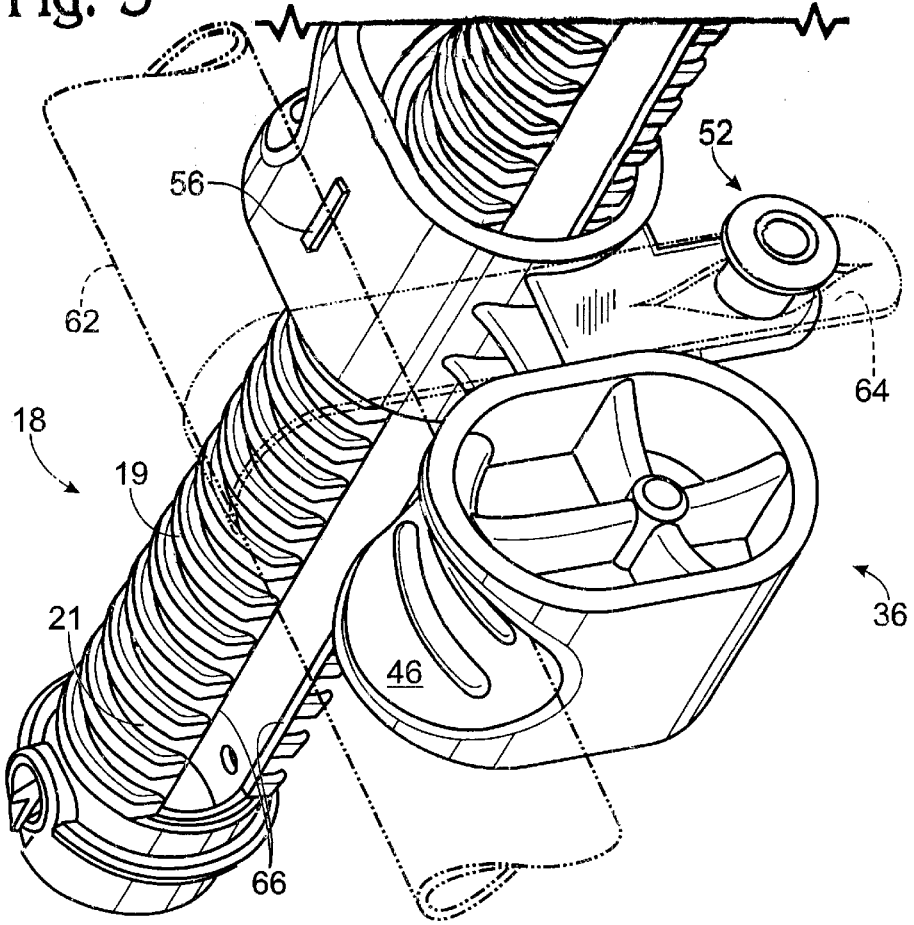
FIG. 5 is an enlarged perspective view of the underside a ribbed support arm sleeve showing a channel for permitting sliding adjustment of the position of a cradle along the sleeve.

FIG. 5 is a view from the underside of a support arm of the bicycle carrier. The cradle 36 is shown in its anti-sway orientation as discussed above with the rubberized saddle 46 of the lower portion of the cradle securing the down tube 62 of a bicycle frame. An elastic strap 64 releasably secures the down tube 62 to the cradle. An elongated channel 66 is formed in the ribbed sleeve and extends along the sleeve, and preferably along the bottom thereof as shown. The channel 66 interrupts the spaced ridges of the ribbed sleeve such that in the region of the channel, no ridges and thus no troughs are formed.

The channel 66 is provided to allow a user to adjust the location of each cradle to any desired position along its support arm to accommodate various size bicycles or a specific carrying requirement. More specifically, the width of the channel 66 is selected such that when the cradle is rotated to align its inwardly projecting tab 43 with the channel, the cradle may be slid along the length of the sleeve 18 with its tab 43 moving freely along the channel 66. Accordingly, in order to move a cradle to a new position on the support arm, the cradle is simply rotated upwardly to align its tab with the channel and slid to the new position. At the new position, the cradle may be rotated back to an operation orientation, whereupon its inwardly projecting tab moves into the trough of the sleeve located at the new position to secure the cradle rotatably at the new position. Thus, the present invention provides quick, easy, and reliable positional adjustment of the cradles without the need for tools or special skills on the part of a user.

FIG. 5 illustrates an opposed pair of cradles of this invention oriented in their respective operational orientations for supporting a bicycle and preventing it from swaying during transport. For clarity of description, the frame of the carrier and the support arms to which the cradles are mounted are not shown. It will be understood, however, that each cradle is mounted to a respective support arm of a carrier frame as described in detail above.

Figure 6:
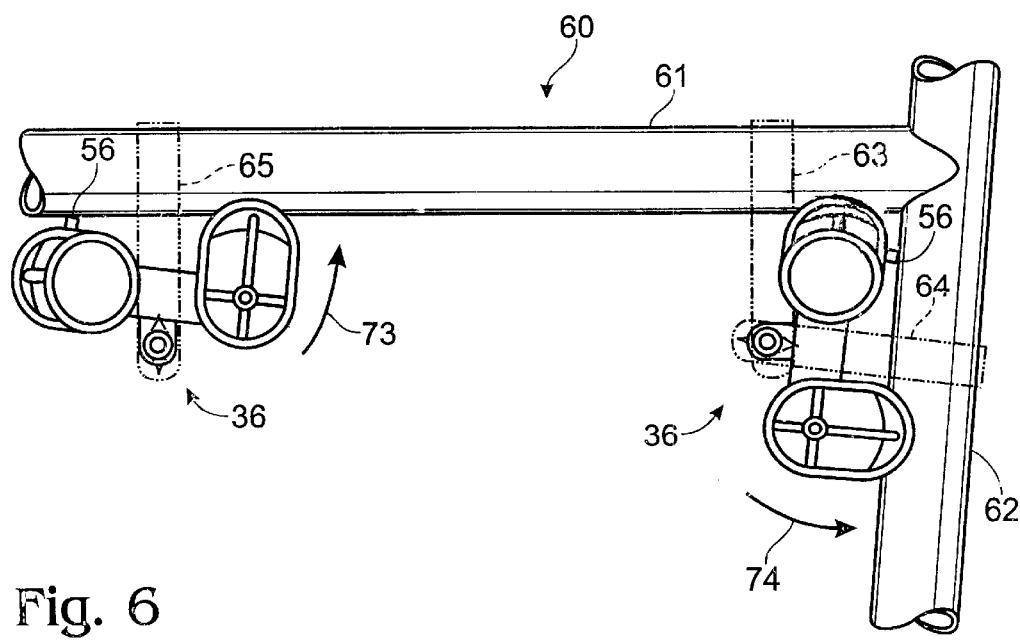
FIG. 6 is an end view illustrating a bicycle frame secured on a bicycle carrier provided with the anti-sway cradles of the present invention.

A bicycle frame 60 is seen mounted on the carrier with its top tube 61 extending across the support arms and its down tube 62 extending downwardly adjacent the right (as seen in FIG. 6) support arm. The right cradle 36 is thus located adjacent the junction of the top tube and the down tube as described relative to FIG. 2 above and is rotated on the support arm to its anti-sway orientation. In this orientation, the top tube 61 of the bicycle frame nestles within the rubberized saddle on the top portion of the cradle and the down tube nestles within the rubberized saddle on the bottom portion of the cradle. Elastic straps 63 and 64 secure the tubes in their respective saddles and the bicycle frame is held and simultaneously preventing from swaying back and forth during transport. In this configuration, rubberized pad 56 rests against the upper portion of the down tube 62 to prevent the down tube from scraping against the hard plastic of the cradle, which might tend to scratch the finish on the bicycle.

The left cradle 36 in FIG. 6 is not located adjacent a down tube of the frame as is the right cradle and thus does not provide an anti-sway function. In fact, this cradle need only receive and hold the other end of the top tube of the bicycle frame to secure the bicycle on the support arms. To provide this function, the cradle 36 is rotated about its support arm as indicated by arrow 73 to engage the saddle on the lower portion of the cradle with the top tube 61 of the frame. An elastic strap is secured about the top tube and attached to the strap posts of the cradle to hold the top tube securely but releasably in place within the saddle. The rubberized pad 56 rests against the top tube at the upper portion of the cradle to prevent scratching the bicycle finish. In this operational orientation of the cradle, the saddle on the upper portion of the cradle is simply idle; that is, it does not receive a tube of the bicycle frame. Instead, the top tube is held firmly in place by the saddle on the lower portion of the cradle.

It will thus be apparent that, with the cradle configuration of the present invention, each of the opposing cradles that support a bicycle and provide the anti-sway function are identical. The function and operation of each cradle is determined by its rotational orientation on its respective support arm rather than by its physical configuration. This simplifies the fabrication, construction, use, and repair of the bicycle carrier significantly since only one cradle configuration is required and the cradles are interchangeable and reversible to accommodate a wide variety bicycle carrying scenarios. This, in conjunction with the quick and easy adjustability of the cradles along their support arms, results in a bicycle carrier with substantially enhanced functionality and versatility when compared to prior art carriers.

The invention has been described herein in terms of preferred embodiments and methodologies. It will be understood by those of skill in the art, however, that many variations of the illustrated embodiments are possible within the scope of the invention. For example, the positioning guides in the illustrated embodiment are an array of circumferential ridges and troughs formed in a ribbed sleeve covering the support arm. However, this embodiment is illustrated only because it is preferred and is the best mode known to the inventors of carrying out the invention. Other configurations of positioning guides certainly are possible such as ridges formed directly in the support arms, an array of indentations formed along the support arms, and detent and spring loaded ball configurations to name a few. All such configurations of positioning guides on the support arms and corresponding positioning members on the cradles that allow quick and easy position adjustment without tools are contemplated within the scope of the invention. Further, the particular materials chosen for the various elements of the preferred embodiments are preferred; however, other materials may well be chosen to meet a particular need or goal. Finally, the particular physical configuration of the cradle of the preferred embodiment is not limiting and a variety of cradle configurations and, indeed, opposed pairs of cradles with different configurations are possible, all within the scope of the invention. These and other additions, deletions, and modifications to the illustrated embodiments may well be made by those of skill in the art without departing from the spirit and scope of the invention as set forth in the claims.

What is claimed is:

1. A bicycle carrier comprising:
   a frame mountable to a vehicle and defining a pair of spaced apart support arms for supporting a bicycle;
   a plurality of spaced apart positioning guides extending along each of said support arms;
   a cradle mounted on each of said support arms for receiving and releasably holding the frame of a bicycle;
   a positioning member on each of said cradles for being selectively mated with one of said positioning guides to locate said cradles at desired positions along said support arms.

2. A bicycle carrier as claimed in claim 1 and further comprising a sleeve mounted on each of said support arms, said sleeves defining said positioning guides.

3. A bicycle carrier as claimed in claim 1 and wherein each of said cradles is configured to receive and hold a top tube of a bicycle frame and wherein at least one of said cradles is configured simultaneously to receive and hold a down tube of the bicycle frame to inhibit swaying motion of the bicycle during transport.

4. A bicycle carrier as claimed in claim 3 and wherein said at least one cradle is rotatable about its support arm when located at a desired position therealong to engage a top tube and a down tube of the bicycle frame simultaneously.

5. A bicycle carrier as claimed in claim 4 and wherein said at least one cradle is formed with a first saddle for receiving and holding a top tube of the bicycle frame and a second saddle for receiving and holding a down tube of the bicycle frame, said second saddle moving into engagement with the down tube upon rotation of said cradle about said support arm.

6. A bicycle carrier as claimed in claim 1 wherein said positioning guides comprise an array of troughs extending along said support arms.

7. A bicycle carrier as claimed in claim 6 and further comprising a ribbed sleeve mounted on each of said support arms, said ribbed sleeves defining said troughs.

8. A bicycle carrier as claimed in claims 6 and wherein said positioning members on said cradles comprise projections configured to be received in said troughs.

9. A bicycle carrier as claimed in claim 8 and wherein said troughs extend circumferentially at least partially around said support arms.

10. A bicycle carrier as claimed in claim 9 and wherein said projections on said cradles are configured to ride in said circumferentially extending troughs to permit selective rotational motion of said cradles about said support arms.

11. A bicycle carrier as claimed in claim 10 and further comprising a channel extending along each of said support arms interrupting said troughs, said cradles being movable along said support arms when rotated to align said projections with said channels for selective adjustment of the positions of said cradles along said support arms.

12. A bicycle carrier as claimed in claim 11 and further comprising a ribbed sleeve mounted on each of said support arms, said ribbed sleeves defining said circumferentially extending troughs.

13. A bicycle carrier as claimed in claim 1 and wherein said cradles are formed with openings through which said support arms extend when said cradles are mounted on said support arms, said positioning members projecting partially into said openings for mating with said positioning guides.

14. A bicycle carrier as claimed in claim 13 and wherein positioning guides comprise an array of circumferentially extending ridges and troughs along said support arms and wherein said positioning members comprise tabs on said cradles extending into said openings, said tabs being configured to be received within selected ones of said troughs to position said cradles along said support arms.

15. A bicycle carrier as claimed in claim 14 and wherein said tabs are configured to ride within said troughs to permit rotational motion of said cradles when selectively positioned on said support arms.

16. A bicycle carrier as claimed in claim 14 and further comprising a ribbed sleeve mounted on and at least partially covering each of said support arms, said ribbed sleeves defining said ridges and troughs.

17. A bicycle carrier as claimed in claim 16 and further comprising a channel extending along said support arms interrupting said ridges, said cradles being movable to selected locations along said support arms when said cradles are rotated to align said tabs with said channel.

18. A bicycle carrier as claimed in claim 17 and further comprising a ribbed sleeve mounted on and at least partially covering each of said support arms, said ribbed sleeves defining said ridges, said troughs, and said channel.

19. A bicycle carrier comprising a frame mountable to a vehicle and defining a pair of spaced support arms, an array of spaced annular ridges and troughs extending along said support arms, a cradle mounted on each of said support arms for receiving and releasably holding selected tubes of a bicycle frame, and a positioning member on each of said cradles adapted to mate with selected ones of said ridges and troughs for locating said cradles at desired positions along said support arms.

20. A bicycle carrier as claimed in claim 19 and wherein said cradles are formed with openings through which said support arms extend when said cradles are mounted on said support arms, said positioning members comprising tabs on said cradles extending partially into said openings, said tabs being configured to be received in selected ones of said troughs.

21. A bicycle carrier as claimed in claim 20 and wherein said tabs are configured to ride in said troughs to permit rotational movement of said cradles when positioned on said support arms.

22. A bicycle carrier as claimed in claim 21 and further comprising a channel extending along each of said support arms interrupting said ridges, said cradles being slidable along said support arms when rotated to align said tabs with said channel to located said cradles at a selected position along said support arms.

23. A bicycle carrier as claimed in claim 22 and further comprising a ribbed sleeve mounted on and at least partially covering each of said support arms, said ribbed sleeve being configured to define said ridges, said troughs, and said channel.

24. A method of providing for selective adjustment of the position of cradles along the support arms of a bicycle carrier comprising the steps of providing an plurality of spaced positioning guides extending along the support arms, providing a positioning member on the cradles adapted to be mated with selected ones of said positioning guides, and mating the positioning member of each cradle with a selected one of said positioning guides.

25. The method of claim 24 and wherein the step of providing positioning guides comprises providing an array of spaced troughs extending along the support arms.

26. The method of claim 25 and wherein the step of providing an array of spaced troughs comprises forming circumferentially ribbed sleeves and at least partially covering the support arms with the ribbed sleeves.

* * * * *